(12) United States Patent
Wicks et al.

(10) Patent No.: US 7,319,427 B2
(45) Date of Patent: Jan. 15, 2008

(54) FREQUENCY DIVERSE ARRAY WITH INDEPENDENT MODULATION OF FREQUENCY, AMPLITUDE, AND PHASE

(75) Inventors: Michael C. Wicks, Utica, NY (US); Paul Antonik, Utica, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 218 days.

(21) Appl. No.: 11/312,805

(22) Filed: Dec. 20, 2005

(65) Prior Publication Data

US 2006/0152403 A1 Jul. 13, 2006

Related U.S. Application Data

(60) Provisional application No. 60/643,431, filed on Jan. 12, 2005.

(51) Int. Cl.
*H01Q 3/00* (2006.01)
*G01S 13/32* (2006.01)
*G01S 13/536* (2006.01)

(52) U.S. Cl. ...................... 342/372; 342/201; 342/25 C
(58) Field of Classification Search ................. 342/372
See application file for complete search history.

(56) References Cited

U.S. PATENT DOCUMENTS

| | | | | |
|---|---|---|---|---|
| 2,449,553 A | * | 9/1948 | Hansel | .......... 342/436 |
| 3,042,916 A | * | 7/1962 | Clarke | .......... 342/380 |
| 4,613,974 A | * | 9/1986 | Vokac et al. | .......... 375/259 |
| 5,943,363 A | * | 8/1999 | Hanson et al. | .......... 375/150 |
| 6,040,759 A | * | 3/2000 | Sanderson | .......... 725/130 |
| 6,252,693 B1 | * | 6/2001 | Blauvelt | .......... 398/194 |
| 6,594,082 B1 | * | 7/2003 | Li et al. | .......... 359/618 |
| 2004/0048574 A1 | * | 3/2004 | Walker et al. | .......... 455/63.1 |
| 2005/0081636 A1 | * | 4/2005 | Barshinger et al. | .......... 73/606 |
| 2006/0063490 A1 | * | 3/2006 | Bader et al. | .......... 455/45 |
| 2006/0098761 A1 | * | 5/2006 | Leizerovich et al. | .......... 375/303 |
| 2006/0152403 A1 | * | 7/2006 | Wicks et al. | .......... 342/25 R |
| 2006/0273255 A1 | * | 12/2006 | Volkov et al. | .......... 250/336.1 |
| 2007/0092025 A1 | * | 4/2007 | Bi et al. | .......... 375/284 |

* cited by examiner

*Primary Examiner*—Thomas H. Tarcza
*Assistant Examiner*—Shelley Chen
(74) *Attorney, Agent, or Firm*—Joseph A. Mancini (57) ABSTRACT

Method and apparatus for a frequency diverse array. Radio frequency signals are generated and applied to a power divider network. A progressive frequency shift is applied to all radio frequency signals across all spatial channels. Amplitude weighting signals are applied for sidelobe control. Phase control is included for channel compensation and to provide nominal beam steering. The progressive frequency offsets generate a new term which cause the antenna beam to focus in different directions as a function of range. Alternative embodiments generate different waveforms to be applied to each radiating element, permitting the transmission of multiple signals at the same time.

31 Claims, 5 Drawing Sheets

FREQUENCY DIVERSE ARRAY WITH INDEPENDENT MODULATION OF FREQUENCY, AMPLITUDE, AND PHASE

PRIORITY CLAIM UNDER 35 U.S.C. §119(e)

This patent application claims the priority benefit of the filing date of provisional application Ser. No. 60/643,431, having been filed in the United States Patent and Trademark Office on Jan. 12, 2005 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of electronically-scanned phased array antennas. More specifically, the present invention relates to electronic beamformers for such antennas.

Phased array antennas have been developed to provide electronic beam steering of radiated or received electromagnetic signals. In traditional phased arrays, the signal applied to all radiating elements is identical. An amplifier is often placed near the radiating element to provide gain and to provide amplitude control for weighting to control sidelobe levels. A phase shifter is placed near the radiating element for beam steering. It is well known in the art that a linear phase shift applied across the radiating elements will cause the mainbeam of the antenna pattern to scan in varying degrees of angle from the boresight or axis of the array.

Frequency scanned arrays achieve similar off-axis mainbeam steering by varying the frequency of the radiated signal as a function of time.

Adaptive nulling was developed to control interference in the sidelobes of the antenna pattern. In this application, a constraint is placed on the amplitude and phase of each element such that the amplitude of the antenna pattern is small in the direction of an interfering signal, thereby attenuating the level of the interfering signal in the sidelobes relative to the amplitude of the desired signal in the mainbeam.

Space-time adaptive processing was developed to provide additional control of signals upon reception, downstream of the antenna.

Synthetic aperture radar was developed to produce long virtual apertures, thereby producing long dwell times and fine resolution of ground objects. In SAR, a small physical aperture is translated in space by the motion of the host platform. As the physical aperture is moved, the signals transmitted and received by the aperture are phase-shifted and added to produce a resultant sum that is similar to that of a larger physical aperture with many elements or subarrays. The virtual aperture is N times larger than the physical aperture, where N is the number of signals integrated, and results in a corresponding improvement in spatial resolution on the ground.

A limitation of the prior art is that, for any instant of time, beam steering is fixed in angle for all ranges. In the current state of the relevant art, multiple antennas or a multiple-beam antenna is required to direct radiated energy to different directions at various ranges.

In some applications, antenna patterns which focus in different directions with range would be very desirable. Such a mechanism would provide more flexible beam scan options, such as multiple transmit beams without spoiling the transmit pattern. Range dependent beamforming would also reduce interference arriving from fixed directions such as multipath.

OBJECTS AND SUMMARY OF THE INVENTION

The present invention provides a range dependent beamformer. Different signals are applied to each radiating element. Input signals are controlled such that the combined signal focuses in different directions depending on range. In the fundamental embodiment of the present invention, the range dependent beamformer simultaneously applies a small but fixed frequency shift relative from one radiating element to the next radiating element. This adds two new terms to the formulation of the phase path difference between any two adjacent elements. Both new terms are dependent on the applied frequency shift, and one of the terms is also dependent upon range. The present invention therefore results in beam focusing and beam pointing that vary with range. Alternative embodiments of the present invention provide for the control of adaptive transmit signals resulting in multiple transmit beams without spoiling, and simultaneous use of radiated energy for multiple conflicting requirements.

It is therefore an object of the present invention to provide an apparatus that overcomes the prior art's limitation of fixed beam scan for a given range.

It is a further object of the present invention to provide reduction of interference from sources located at fixed angles, such as multipath.

It is still a further object of the present invention to provide an apparatus wherein spotlight and strip map synthetic aperture radar can be performed simultaneously through common equipment.

It is yet still a further object of the present invention to provide an apparatus wherein signals of multiple classes can be radiated and utilized at the same time, such as synthetic aperture radar signals simultaneously with ground moving target indication signals, or communications signals simultaneously with radar signals.

An additional object of the present invention is to overcome a fundamental limitation of conventional synthetic aperture radar, wherein a small aperture is required for long dwell and fine cross-range resolution.

An additional object of the present invention is to also simultaneously provide multiple transmit beams without spoiling.

Briefly stated, the present invention achieves these and other objects through independent control of signals applied to radiating elements. A radio frequency signal is generated and applied to each radiating element. Signal generation is under the control of a waveform control subsystem. The waveform control subsystem adjusts the frequency, phase, polarization, and amplitude of all input signals. Input signals are selected to achieve range dependent beamforming.

Radio frequency signals are generated and applied to a power divider network. A progressive frequency shift is applied to all radio frequency signals across all spatial channels. Amplitude weighting signals are applied for sidelobe control. Phase control is included for channel compensation and to provide nominal beam steering. The progressive frequency offsets generate a new term which cause the antenna beam to focus in different directions as a function of range. Alternative embodiments generate different waveforms to be applied to each radiating element, permitting the transmission of multiple signals at the same time.

In the fundamental embodiment of the present invention, a waveform generator produces a radio frequency signal at the input of a power divider network. The input signal is then applied to a series of multiplexers, one for each element or spatial channel, which applies frequency shifts under the direction of a waveform control subsystem. The nominal frequency shift of each channel varies linearly with position in the array, and the frequency shifts of all elements or spatial channels are applied simultaneously. The frequency-shifted signals are then amplified for gain and to apply amplitude weighting for sidelobe control. The signals are also phase shifted for nominal steering of the radiation pattern.

According to an embodiment of the present invention, method and apparatus for a frequency diverse array to provide range dependent beamforming comprises a radio frequency signal source, a series of multiplexers, a bank of amplifiers, a bank of phase shifters, an array of radiating elements, and a waveform control subsystem.

Application of a linear frequency shift across the aperture results in an antenna radiation pattern that varies with range. A greater or lesser degree of variation can be achieved by increasing or decreasing the amount of frequency shift between spatial channels. By varying the applied frequency shift with time, the antenna beam pattern can be made to scan a volume as directed by the waveform control subsystem.

In contrast to prior art devices, the present invention produces an antenna radiation pattern that varies with range. Nothing in the prior art teaches or suggests this feature of the present invention.

Therefore, it is accurate to say that the present invention (1.) can produce an antenna radiation pattern that varies with range; and (2.) can therefore mitigate the effects of interference from fixed angular positions such as multipath. As such, the present invention represents a significant improvement over prior art methods and apparatus.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
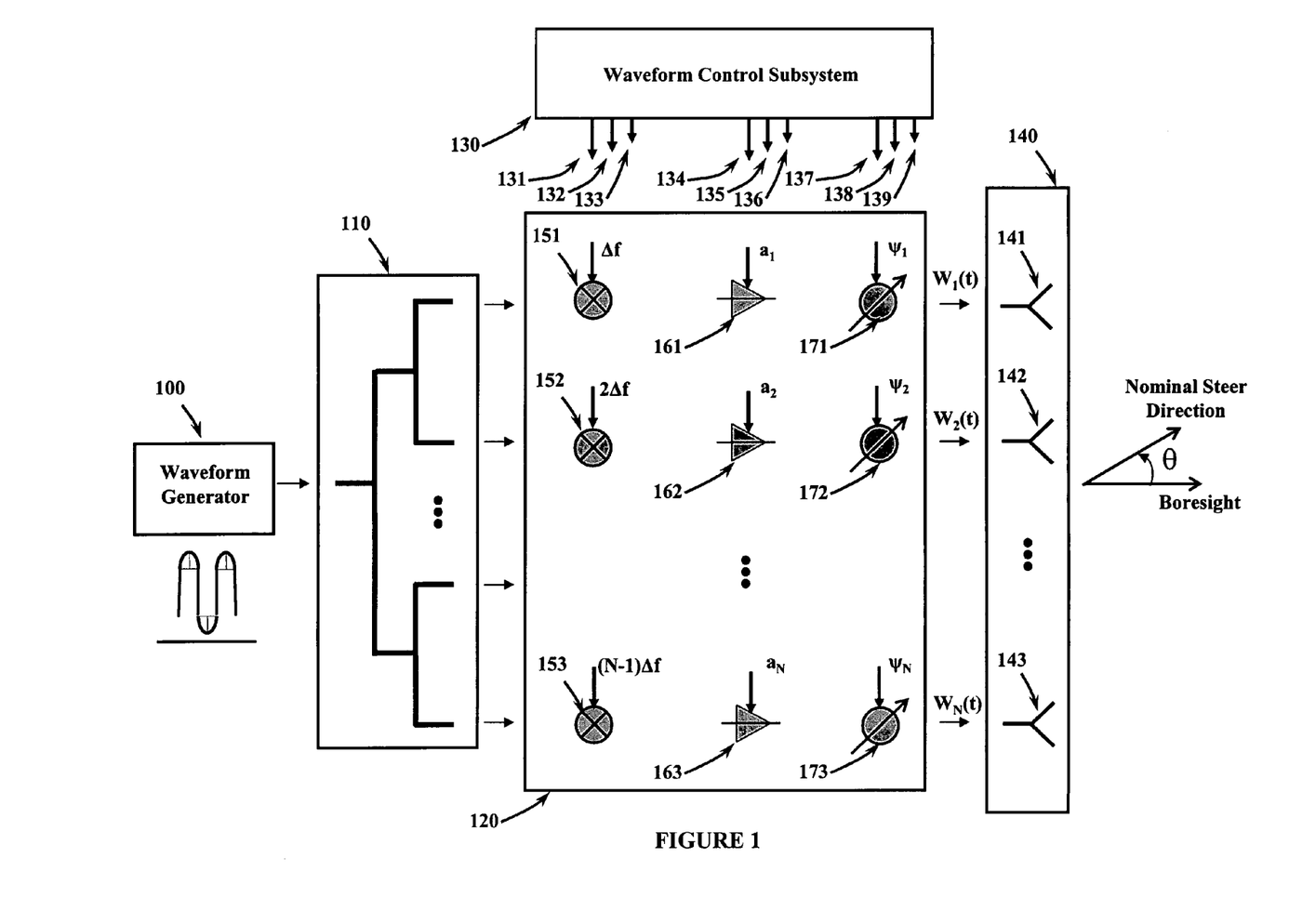
FIG. 1 is a schematic diagram representation of the present invention.

Referring to FIG. 1, the key components of a generic range dependent beamformer include a waveform generator 100, a power divider network 110, which is a conventional corporate feed network in the preferred embodiment, a transmitter/receiver module 120, a waveform control subsystem 130, and a radiating element array 140.

The waveform generator 100 synthesizes a signal to be transmitted. This signal is distributed to each of the first and second through the nth radiating/receiving elements 141, 142, 143 by means of a power divider network 110. The signal output of each of the power divider network 110 outputs is input to a transmitter/receiver module 120. The transmitter/receiver module 120 consists of a set of first and second through an nth modulator 151, 152, 153 followed by a first and a second through an nth radio frequency amplifier 161, 162, 163 and a first and second through an nth phase shifter 171, 172, 173. The transmitter/receiver module 120 is controlled by a waveform control subsystem 130, which sends a plurality of control signals for each of frequency 131, 132, 133, amplitude 134, 135, 136, and phase 137, 138, 139. The outputs of the transmitter/receiver module 120 are provided to an antenna array 140 consisting of radiating/receiving elements 141, 142, 143, which may, in turn, be subarrays of radiating/receiving elements.

Still referring to FIG. 1, a plurality of spatial channels is depicted. The actual number of transmitter/receiver module 120 signal outputs $W_1(t) \ldots W_N(t)$ 171, 172 and 173 in the preferred embodiment depends upon the number of antenna elements 141, 142, and 143. It follows that the number of modulators 151, 152 and 153, amplifiers 161, 162 and 163, and phase shifters 171, 172 and 173 will be identical to the number of power divider 110 output branches.

Still referring to FIG. 1, the waveform control subsystem 130 provides a plurality of frequency modulation control signals 131, 132, 133, amplitude modulation control signals 134, 135, 136 and phase modulation control signals 137, 138, 139 to each respective frequency, amplitude and phase modulation section of the transmit/receive module 120. The amplitude modulation control signal 134, 135, 136 permits power control as well as a mechanism to apply amplitude weighting for antenna sidelobe control. The phase modulation control signal 137, 138, 139 introduces a radiating/receive element-to-radiating/receive element phase shift for conventional or nominal beam steering, which is independent of the range-dependent beam steering afforded by the frequency modulation control signal 131, 132, 133. In the preferred embodiment, the frequency modulation control signal provides a frequency shift which increases linearly across radiating/receive elements at any point in time.

If all of the signal output waveforms $W_1(t) \ldots W_N(t)$ being radiated or received from the radiating/receiving elements 141, 142 and 143, are identical with identical phase, the antenna beam will point at broadside, or orthogonal to the face of the antenna aperture. Now consider a far field target at an angle θ with respect to broadside direction. If all of the waveforms are identical continuous wave signals, then the only difference between the returns from adjacent radiating elements 141 and 142 is due to path length difference:

$$R_1 - R_2 = d \sin(\theta),$$

where d is the spacing between any two adjacent elements 141 and 142.

The path length difference results in a phase shift from element 141 to element 142:

$$\psi = 2\pi d/\lambda \sin(\theta)$$

An incremental phase shift $\psi$ from element-to-element (linear phase progression across the aperture) will steer the antenna mainbeam to angle $\theta$.

Next, allowing the frequency of the waveform radiated/received from each element to increase by a small amount, $\Delta f$, from element-to-element, then for element 141, the one-way electrical path length in wavelengths is:

$$l_1 = R_1/\lambda_1 = R_1 f_1/c.$$

For element 142, the electrical path length becomes:

$$\begin{aligned}
l_2 &= R_2/\lambda_2 \\
&= R_2 f_2/c \\
&= \{R_1 - d\sin(\theta)\} f_2/c \\
&= \{R_1 - d\sin(\theta)\}\{f_1 + \Delta f\}/c \\
&= R_1 f_1/c - d\sin(\theta) f_1/c + R_1 \Delta f/c - d\sin(\theta)\Delta f/c.
\end{aligned}$$

The electrical path length difference between element 141 and element 142, in radians, is then:

$$\psi = -2\pi d \sin(\theta) f_1/c + 2\pi R_1 \Delta f/-2\pi d \sin(\theta) \Delta f/c,$$

provided that $\Delta f$ is negligible in computing the path length difference.

The new terms due to frequency diversity are $2\pi R_1 \Delta f/c$ and $-2\pi d \sin(\theta) \Delta f/c$. The first term is range and frequency offset dependent, while the second term is dependent on the scan angle and frequency offset. The first new term shows that for a frequency diverse array in the present invention the apparent scan angle of the antenna now depends on range.

In a frequency diverse array a frequency shift is applied across elements rather than solely as a function of time.

Figure 2:
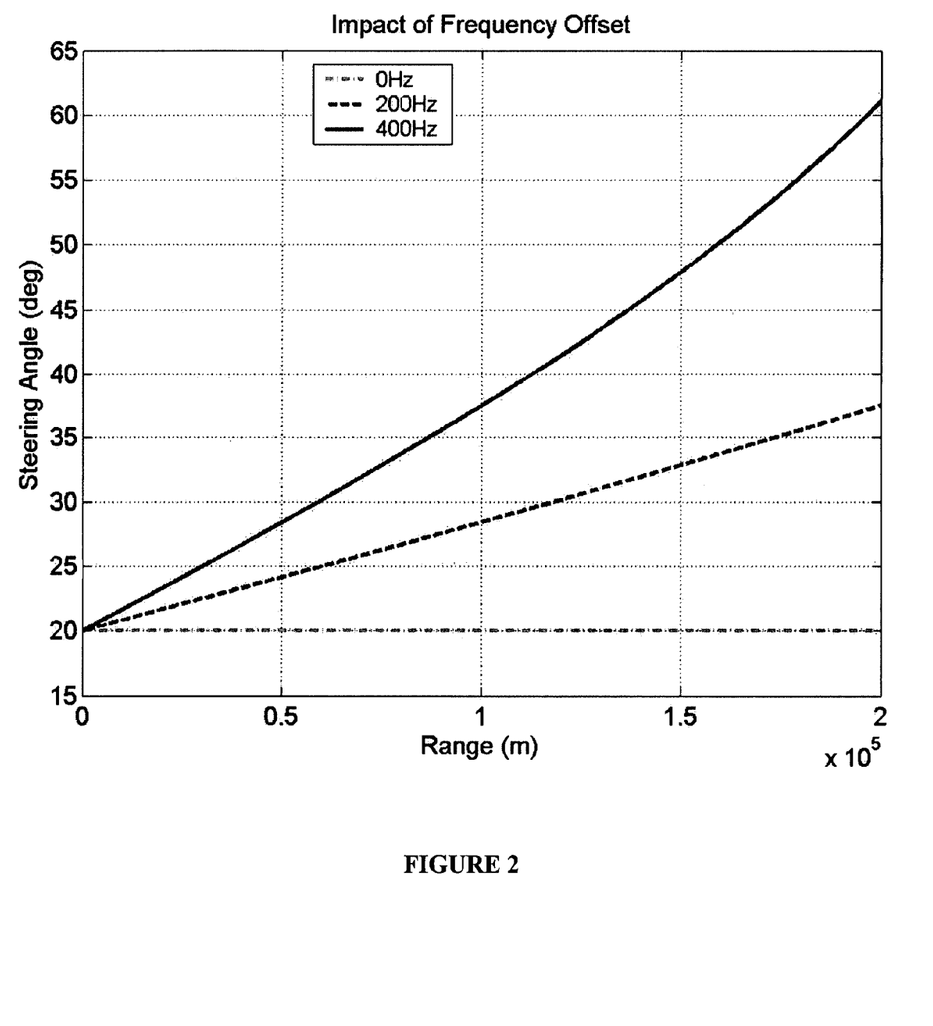
FIG. 2 is a graphical representation of beam scan versus range for an antenna array operating at 10 Giga Hertz (GHz) for frequency shifts of 0 Hz, 200 Hz, and 400 Hz.

Referring now to FIG. 2, the effect of range-dependent beamforming for a frequency diverse array is depicted. Scan angle is plotted as a function of range for various frequency offsets at a nominal steering direction of 20 degrees. The most significant beam bending is achieved for larger frequency offsets. The frequency offset, $\Delta f$, must be less than the reciprocal of a receiver's coherent observation interval in order to make the individual waveforms inseparable.

Figure 3:
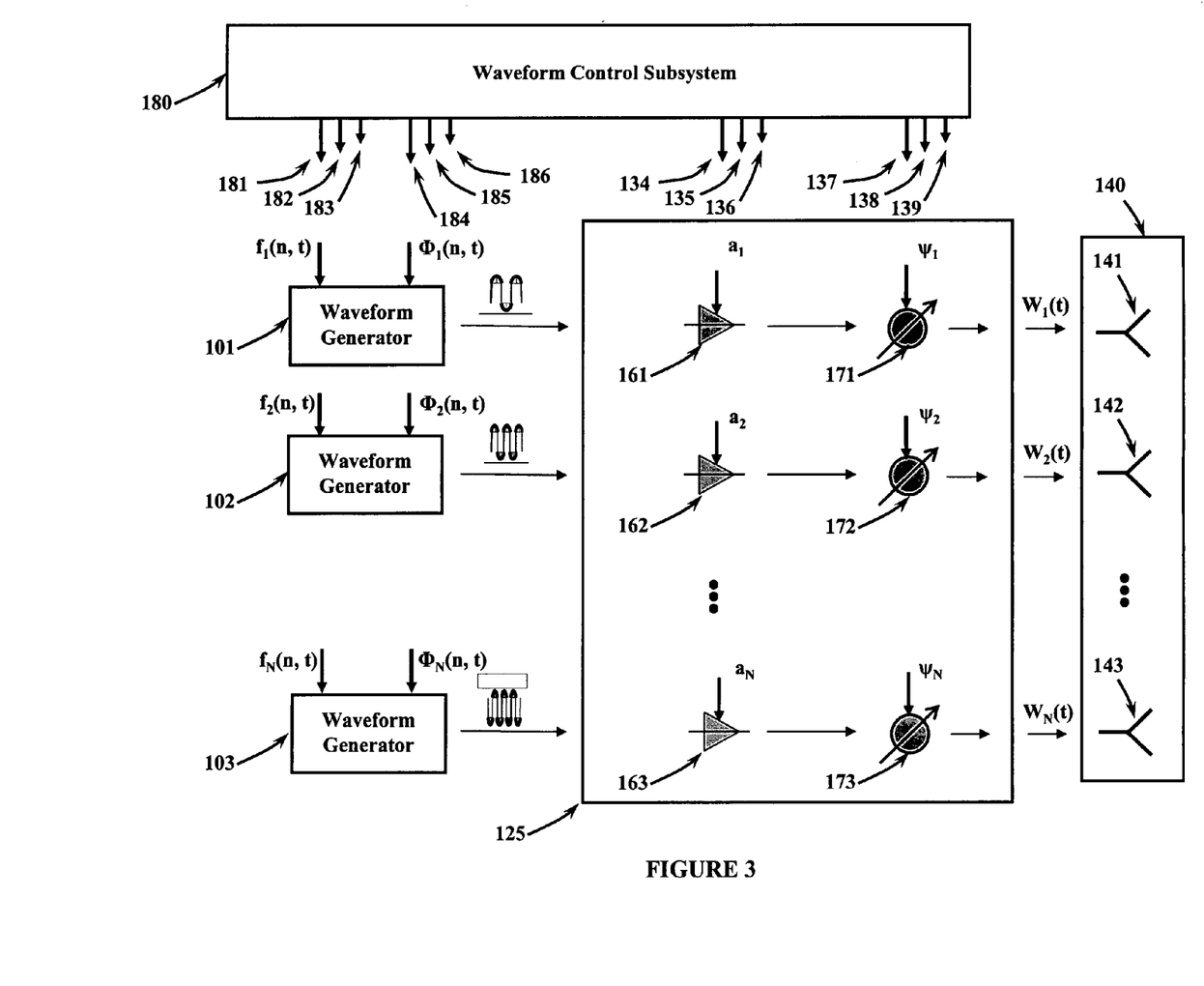
FIG. 3 is a schematic diagram representation of an alternative embodiment of the present invention to provide more control over synthesis of transmitted signals.

Referring now to FIG. 3, an alternative embodiment to provide more control over synthesis of transmitted signals is depicted. A plurality of waveform generators 101, 102 through 103 output radio frequency signals which are provided to a transmit/receive module 125. As in the preferred embodiment, the outputs of the transmit/receive module 125 are provided to a like plurality of antenna radiating/receiving elements 141, 142 through 143. A waveform control subsystem 180 provides frequency modulation control signals 181, 182, 183 and phase modulation control signals 184, 185, 186 to the waveform generators 101, 102 through 103. The frequency and phase modulation control signals provide pulse-to-pulse and element-to-element frequency and phase diversity to the waveform generators as a function of time. The waveform control subsystem 180 also provides amplitude control signals 134, 135, 136 for power control and antenna weighting, and phase control signals 137, 138, 139 for nominal beam steering. The frequency modulation control signals 181, 182, 183 and the phase modulation control signals 184, 185, 186 permit the radiation of multiple signal modes at the same time.

Figure 4:
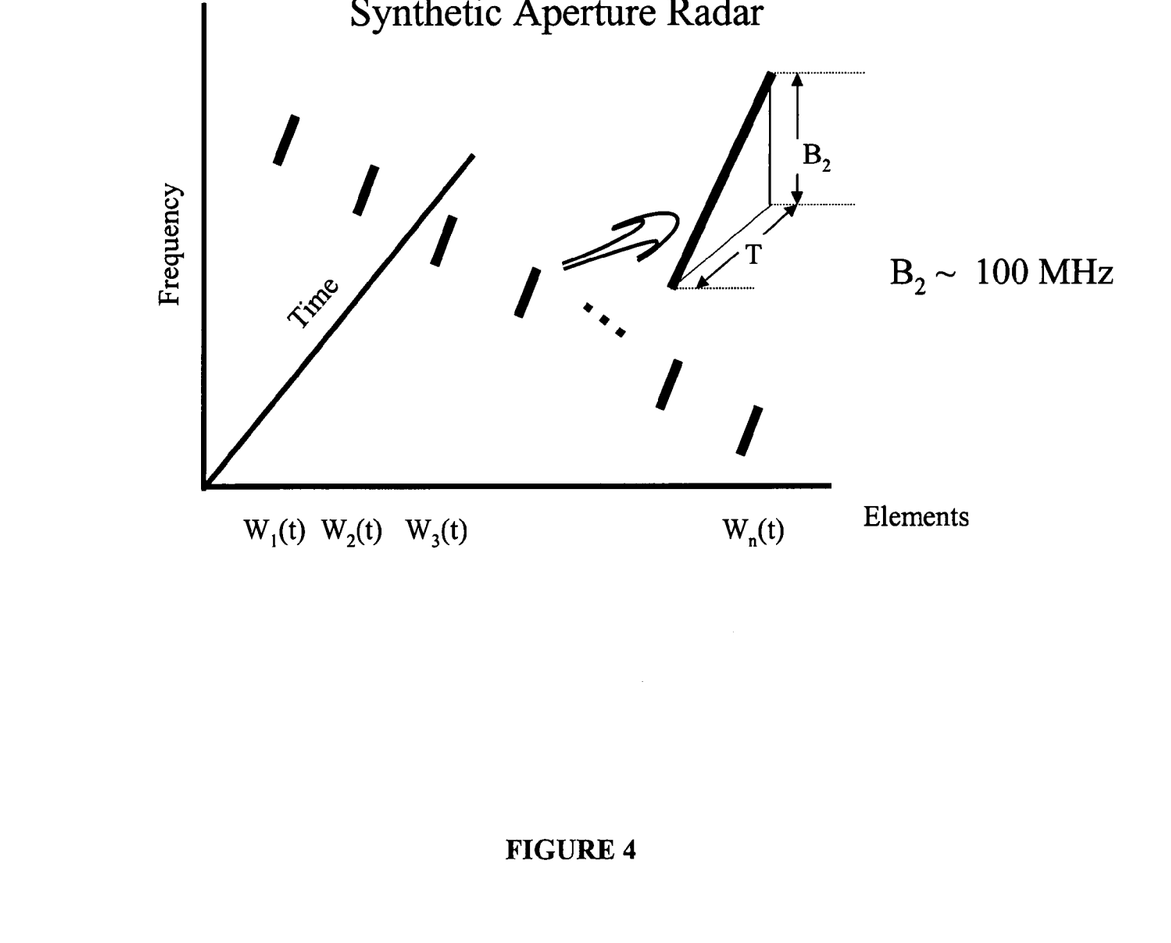
FIG. 4 is a graphical representation of an alternative embodiment of the present invention configured to achieve spotlight and strip map synthetic aperture radar simultaneously.

Referring to FIG. 4 a space-time illumination wherein the waveform generators 101, 102, 103 (see FIG. 3) output a plurality of linear frequency modulation signals to the transmit/receive module is depicted. A channel-to-channel frequency offset is also applied, as in the preferred embodiment. Different linear frequency modulation signals are applied to each antenna element 141, 142, 143 (see FIG. 3), to permit spotlight synthetic aperture radar and stripmap synthetic aperture radar modes at the same time. By processing all received signals in combination as well as separately, the described illumination permits a large aperture on transmit for high gain while enabling a plurality of spotlight synthetic aperture radars to operate simultaneously. The invention therefore defeats a fundamental limitation of conventional synthetic aperture radar, wherein a small aperture is required for long dwell and fine cross-range resolution.

Figure 5:
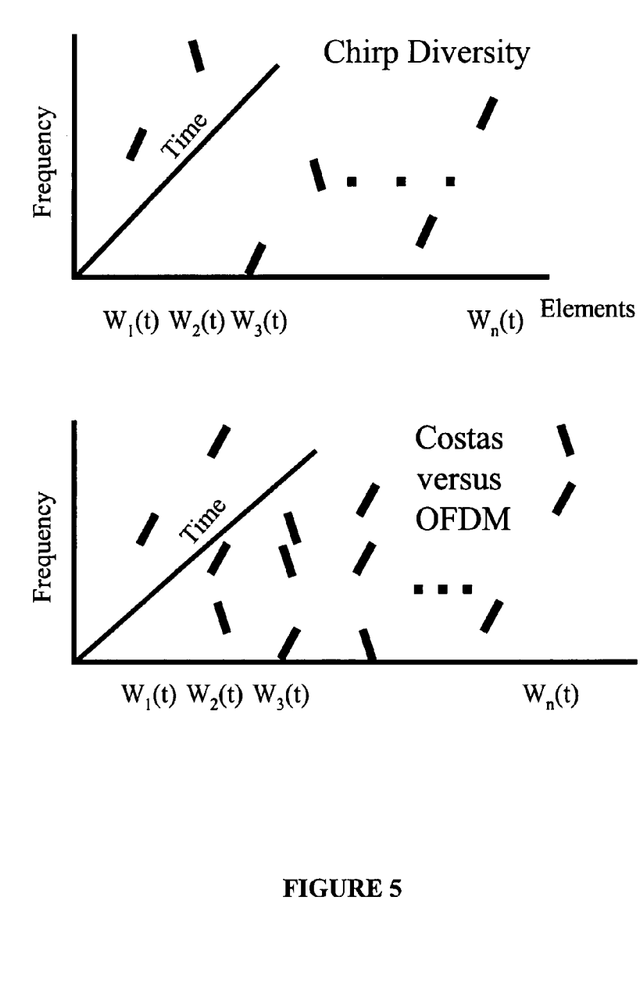
FIG. 5 is a graphical representation of an alternative embodiment of the present invention configured to achieve synthetic aperture radar and ground moving target indication simultaneously.

Referring to FIG. 5 a space-time illumination to achieve synthetic aperture radar and ground moving target indication at the same time is depicted. In the prior art, synthetic aperture radar and ground moving target indication are fundamentally different processes. Synthetic aperture radar is an integration process which requires on the order of hundreds of megahertz of bandwidth to achieve sufficient range resolution for imaging. Ground moving target indication is a differencing process that requires only several megahertz of bandwidth for detection. The present invention permits modes to be constructed to support synthetic aperture radar and ground moving target indication at the same time by providing chirp diversity and phase modulation across the transmit/receive elements 141, 142 through 143, and processing all elements in combination and individually.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for electronically forming an antenna beam pattern, comprising:

a waveform generator producing as an output a radio frequency (RF) signal;

a power divider having at least one input and having a plurality of output branches, said input being connected to the output of said waveform generator so as to produce as an output of said power divider a plurality of RF signals;

a transmit/receive module having a plurality of inputs and outputs and having a channel disposed between each of said plurality of corresponding inputs and outputs;

wherein each of said plurality of inputs being connected correspondingly to each of said plurality of output branches of said power divider, and wherein said transmit/receive module further comprises means for:

modulating the frequency, amplitude, and phase characteristics of at least one of said plurality of RF signals;

modulating any of said characteristics independently of any of said other characteristics; and modulating any of said characteristics of any of said plurality of RF signals independently of any of other said plurality of RF signals;

a waveform control subsystem having means for applying signals to said transmit/receive module so as to control said means for modulating said frequency, amplitude, and phase characteristics; and at least one RF radiating/receiving element being connected to at least one of said transmit/receive module outputs.

2. Said channel of claim 1, further comprising means for RF signal mixing and phase shifting.

3. Said channel of claim 2, further comprising means for RF signal amplifying.

4. Waveform control subsystem of claim 1, wherein said means for applying signals to said transmit/receive module further comprises:

a frequency modulation control signal channel;
an amplitude modulation control signal channel; and
a phase modulation control signal channel corresponding to each of said disposed channels of said transmit/receive module.

5. Means for applying signals of claim 4, further comprising a frequency characteristic that:

is independently scalable in frequency; and
that increases for each successive said disposed channel, from a minimum frequency value in the first said disposed channel and to a maximum frequency value in the Nth said disposed channel for each of said frequency modulation control signal channels.

6. Frequency characteristic of claim 5, wherein said frequency characteristic varies linearly with time.

7. Frequency characteristic of claim 5, wherein said frequency characteristic varies non-linearly with time.

8. Means for applying signals of claim 4, further comprising:

an independently scalable amplitude characteristic for each of said amplitude modulation control signal channels.

9. Means for applying signals of claim 4, further comprising:

an independently scalable phase characteristic for each of said phase modulation control signal channels.

10. Means for applying signals of claim 9, wherein said phase characteristic that varies linearly with time.

11. Means for applying signals of claim 9, wherein said phase characteristic that varies non-linearly with time.

12. Means for applying signals of claim 9, wherein said phase characteristic that varies from pulse-to-pulse with time.

13. Said channel of claim 3, wherein the input of said means for mixing is connected to said input of said channel;
the output of said means for mixing is connected to the input of said means for amplifying;
the output of said means for amplifying is connected to the input of said means for phase shifting; and
the output of said means for phase shifting is connected to said output of said channel.

14. Method for electronically forming an antenna beam pattern, comprising:

generating a radio frequency (RF) signal;
dividing said RF signal into a plurality of RF signals;
channelizing each of said plurality of RF signals into a plurality of channels, wherein each of said plurality of channels has a corresponding input and output;
modulating the frequency, amplitude, and phase characteristics of at least one of said plurality of channelized RF signals;
 modulating any of said characteristics independently of any of said other characteristics; and
 modulating any of said characteristics of any of said plurality of channelized RF signals independently of any of other said plurality of channelized RF signals;
applying signals to said plurality of channelized RF signals so as to modulate said frequency, amplitude, and phase characteristics; and
radiating into free space at least one of said plurality of channelized RF signals through at least one RF radiating/receiving element being connected to at least one of said outputs of said plurality of channels.

15. Method of claim 14, wherein said step of modulating any of said characteristics further comprises the steps of mixing and phase shifting said plurality of channelized RF signals.

16. Method of claim 15, wherein said step of modulating any of said characteristics further comprises the step of amplifying said plurality of channelized RF signals.

17. Step of applying modulating signals to said plurality of channelized RF signals of claim 14, further comprising the step of:

channelizing each of said applied modulating signals into a corresponding frequency modulation control signal channel, amplitude modulation control signal channel and phase modulation control signal channel for each of said plurality of channelized RF signals.

18. Step of channelizing each of said applied modulating signals into a corresponding frequency modulation control signal channel of claim 17, further comprising the steps of:

scaling frequency independently; and
scaling frequency from a minimum frequency value for the first of said plurality of channelized RF signals to a maximum frequency value for the Nth said plurality of channelized RF signals for each of said frequency modulation control signal channels.

19. Step of scaling frequency of claim 18, wherein said frequency scaling varies linearly with time.

20. Step of scaling frequency of claim 18, wherein said frequency scaling varies non-linearly with time.

21. Step of applying signals of claim 17, further comprising the step of:

scaling the amplitude of each of said amplitude modulation control signal channels independently of each other.

22. Step of applying signals of claim 17, further comprising the step of:

scaling the phase of each of said phase modulation control signal channels independently of each other.

23. Step of scaling phase of claim 22, further comprising the step of scaling said phase linearly with time.

24. Step of scaling phase of claim 22, further comprising the step of scaling said phase non-linearly with time.

25. Step of scaling phase of claim 22, further comprising the step of scaling said phase arbitrarily from pulse-to-pulse with time.

26. Step of applying signals to said plurality of channelized RF signals of claim 14, further comprising the step of applying said signals with particularity so as to permit simultaneous stripmap and spotlight synthetic aperture radar functionality through a common aperture of RF radiating/receiving elements.

27. Step of applying signals to said plurality of channelized RF signals of claim 14, further comprising the step of applying said signals with particularity so as to permit simultaneous ground moving target indication and spotlight synthetic aperture radar functionality through a common aperture of RF radiating/receiving elements.

28. Step of applying signals to said plurality of channelized RF signals of claim 14, further comprising the step of applying said signals with particularity so as to permit simultaneous communications and radar functionality through a common aperture of RF radiating/receiving elements.

29. Step of applying signals to said plurality of channelized RF signals of claim 14, further comprising the step of applying said signals with particularity so as to provide adaptive processing by generating a steering vector.

30. Step of generating a steering vector of claim 29, further comprising the step of introducing frequency offsets so as to form beams dependent upon range.

31. Step of introducing frequency offsets of claim 30, wherein said frequency offsets further comprise Doppler offsets.

* * * * *